(12) United States Patent
Murase et al.

(10) Patent No.: US 11,511,657 B2
(45) Date of Patent: Nov. 29, 2022

(54) SEAT APPARATUS AND SEAT SYSTEM

(71) Applicant: KOITO ELECTRIC INDUSTRIES, LTD., Shizuoka (JP)

(72) Inventors: Shogo Murase, Shizuoka (JP); Takao Okura, Shizuoka (JP)

(73) Assignee: KOITO ELECTRIC INDUSTRIES, LTD., Shizuoka (JP)

( * ) Notice: Subject to any disclaimer, the term of this patent is extended or adjusted under 35 U.S.C. 154(b) by 0 days.

(21) Appl. No.: 17/279,843

(22) PCT Filed: Jul. 29, 2019

(86) PCT No.: PCT/JP2019/029652
§ 371 (c)(1),
(2) Date: Mar. 25, 2021

(87) PCT Pub. No.: WO2020/066272
PCT Pub. Date: Apr. 2, 2020

(65) Prior Publication Data
US 2021/0394658 A1 Dec. 23, 2021

(30) Foreign Application Priority Data
Sep. 28, 2018 (JP) .............................. JP2018-183329

(51) Int. Cl.
*B60N 2/90* (2018.01)
*B60N 2/02* (2006.01)

(52) U.S. Cl.
CPC ............ *B60N 2/995* (2018.02); *B60N 2/0244* (2013.01); *B60N 2002/0272* (2013.01)

(58) Field of Classification Search
CPC .................. B60N 2/995; B60N 2/0244; B60N 2002/0272
(Continued)

(56) References Cited

U.S. PATENT DOCUMENTS

| | | | |
|---|---|---|---|
| 6,731,088 | B2 | 5/2004 | Nivet |
| 2002/0113478 | A1 | 8/2002 | Kasahara |
| 2014/0145476 | A1 | 5/2014 | Nagayasu |

FOREIGN PATENT DOCUMENTS

| | | |
|---|---|---|
| JP | 10-157619 A | 6/1998 |
| JP | 2002-248971 A | 9/2002 |

(Continued)

OTHER PUBLICATIONS

Office Action dated Jul. 28, 2021 in Japanese Application No. 2020-548073.
(Continued)

*Primary Examiner* — Mark R Wendell
(74) *Attorney, Agent, or Firm* — Saliwanchik, Lloyd & Eisenschenk

(57) ABSTRACT

[Object] To inhibit leg rests from colliding with each other and to allow a leg rest of his/her own seat to operate even in the case where a power source failure or the like occurs.
[Solving Means] A seat apparatus according to an embodiment of the present invention includes: a seat body; a control unit; and a setting means. The seat body includes a leg rest. The control unit includes a controller. The controller determines whether the seat body is in a first state in which the seat body does not face a front seat or a back seat of the seat body or a second state in which the seat body faces one of the front seat and the back seat. The controller enables, where the controller has determined that the seat body is in the first state, a tilt operation command for the leg rest to tilt forward, and invalidates, where the controller has determined that the seat body is in the second state, the tilt operation command. The setting means fixes the determination result by the controller to the first state.

8 Claims, 11 Drawing Sheets

(58) Field of Classification Search
USPC .................................................... 297/423.26
See application file for complete search history.

(56) References Cited

FOREIGN PATENT DOCUMENTS

| | | |
|---|---|---|
| JP | 2014-4325 A | 1/2014 |
| JP | 2015-209193 A | 11/2015 |
| JP | 2018-16135 A | 2/2018 |
| TW | 201832953 A | 9/2018 |
| WO | WO-2018/143112 A1 | 8/2018 |

OTHER PUBLICATIONS

International Search Report dated Sep. 10, 2019 in International Application No. PCT/JP2019/029652.
Office Action dated May 6, 2020 in Taiwanese Application No. 108127102, along with its English translation.
Office Action dated Jan. 31, 2022 in Indian Application No. 202117016433.
Office Action dated Mar. 2, 2022 in Japanese Application No. 2020-548073.
Office Action dated Jul. 28, 2022 in Chinese Application No. 201980062644.4.

| | Seat orientation | | Own seat detection switch state | | Own seat detection circuit state | | | | Own seat leg rest (14) |
|---|---|---|---|---|---|---|---|---|---|
| | Front seat (101) | Own seat (100) | Back seat (102) | Detection SW (5A) <ON in outbound orientation> | Detection SW (5B) <ON in inbound orientation> | Detection circuit (6B) | Detection circuit (6A) | Detection circuit (6D) | Detection circuit (6C) | |
| 1-1 | Inbound | Inbound | Inbound | OFF | ON | 1 | 0 | 1 | 0 | Operation permitted |
| 1-2 | Inbound | Inbound | Outbound | OFF | ON | 1 | 0 | 1 | 0 | Operation permitted |
| 1-3 | Outbound | Inbound | Inbound | OFF | ON | 0 | 0 | 1 | 1 | Regulated |
| 1-4 | Outbound | Inbound | Outbound | OFF | ON | 0 | 0 | 1 | 0 | Regulated |
| 1-5 | Inbound | Outbound | Inbound | ON | OFF | 1 | 1 | 0 | 0 | Regulated |
| 1-6 | Inbound | Outbound | Outbound | ON | OFF | 1 | 1 | 0 | 1 | Operation permitted |
| 1-7 | Outbound | Outbound | Inbound | ON | OFF | 0 | 1 | 0 | 0 | Regulated |
| 1-8 | Outbound | Outbound | Outbound | ON | OFF | 0 | 1 | 0 | 1 | Operation permitted |

FIG.10

| | Seat orientation | | | Own seat detection switch state | | Own seat detection circuit state | | | | Own seat leg rest (14) |
|---|---|---|---|---|---|---|---|---|---|---|
| | Front seat (101) | Own seat (100) | Back seat (102) | Detection SW (5A) <ON in outbound orientation> | Detection SW (5B) <ON in inbound orientation> | Detection circuit (6B) | Detection circuit (6A) | Detection circuit (6D) | Detection circuit (6C) | |
| 2-1 | Inbound power source failure | Inbound | Inbound | OFF | ON | 0 | 0 | 1 | 0 | Regulated |
| 2-2 | Inbound power source failure | Inbound | Outbound | OFF | ON | 0 | 0 | 1 | 1 | Regulated |
| 2-3 | Outbound power source failure | Outbound | Inbound | ON | OFF | 0 | 1 | 0 | 0 | Regulated |
| 2-4 | Outbound power source failure | Outbound | Outbound | ON | OFF | 1 | 1 | 0 | 1 | Operation permitted |
| 2-5 | Inbound | Inbound | Inbound power source failure | OFF | ON | 0 | 0 | 1 | 0 | Operation permitted |
| 2-6 | Outbound | Inbound | Inbound power source failure | OFF | ON | 1 | 1 | 1 | 0 | Regulated |
| 2-7 | Inbound | Outbound | Outbound power source failure | ON | OFF | 0 | 1 | 0 | 0 | Regulated |
| 2-8 | Outbound | Outbound | Outbound power source failure | ON | OFF | 0 | 1 | 0 | 0 | Regulated |

FIG.11

|   | Seat orientation | | | Own seat detection switch state | | Own seat detection circuit state | | | | Own seat leg rest (14) |
|---|---|---|---|---|---|---|---|---|---|---|
|   | Front seat (101) | Own seat (100) | Back seat (102) | Detection SW (5A) <ON in outbound orientation> | Detection SW (5B) <ON in inbound orientation> | Detection circuit (6B) | Detection circuit (6A) | Detection circuit (6D) | Detection circuit (6C) |   |
| 2-1 | Inbound power source failure | Inbound | Inbound | OFF | ON | 1 | 0 | 1 | 1 | Operation permitted |
| 2-2 | Inbound power source failure | Inbound | Outbound | OFF | ON | 1 | 0 | 1 | 1 | Operation permitted |
| 2-3 | Outbound power source failure | Outbound | Inbound | ON | OFF | 1 | 1 | 0 | 1 | Operation permitted |
| 2-4 | Outbound power source failure | Outbound | Outbound | ON | OFF | 1 | 1 | 0 | 1 | Operation permitted |
| 2-5 | Inbound | Inbound | Inbound power source failure | OFF | ON | 1 | 0 | 1 | 1 | Operation permitted |
| 2-6 | Outbound | Inbound | Inbound power source failure | OFF | ON | 1 | 0 | 1 | 1 | Operation permitted |
| 2-7 | Inbound | Outbound | Outbound power source failure | ON | OFF | 1 | 1 | 0 | 1 | Operation permitted |
| 2-8 | Outbound | Outbound | Outbound power source failure | ON | OFF | 1 | 1 | 0 | 1 | Operation permitted |

FIG.12

SEAT APPARATUS AND SEAT SYSTEM

CROSS-REFERENCE TO RELATED APPLICATIONS

This application is the U.S. national stage application of International Patent Application No. PCT/JP2019/029652, filed Jul. 29, 2019, which claims the benefit under 35 U.S.C. § 119 of Japanese Application No. 2018-183329, filed Sep. 28, 2018, the disclosures of each of which are incorporated herein by reference in their entirety.

TECHNICAL FIELD

The present invention relates to a seat apparatus including a leg rest, and to a seat system.

BACKGROUND ART

In the past, there has been some seat apparatuses provided in railway vehicles or the like, which include a leg rest for providing a comfortable ride. Such a seat apparatus including a leg rest is configured to be capable of tilting the leg rest forward and backward by an electric motor between the footrest position and the housing position upon an input operation of a user (seated person).

Meanwhile, the seat apparatuses provided in railway vehicles or the like are rotatably installed on seat bases placed on a floor surface. Typically, each seat apparatus is used in the travelling direction. The seat apparatus is reversed by an operation of a user such as a passenger, and used in the direction opposite to the travelling direction in some cases. In the case where the leg rests of the seat apparatuses are operated while the seat apparatuses face each other in the front-rear direction, there is a possibility that the leg rests collide with each other or luggage or the user's foot is caught.

In this regard, for example, Patent Literature 1 proposes a technology of detecting, in an electric seat that drives a leg rest by an electric motor, a current consumed by the operation of the leg rest, determining, in the case where the value thereof exceeds a reference value set in advance, that an unnecessary reaction force is acting, and stopping the driving of the leg rest. In accordance therewith, it is possible to inhibit the leg rest and luggage from being damaged or ensure safety.

CITATION LIST

Patent Literature

Patent Literature 1: Japanese Patent Application Laid-open No. 2002-248971

DISCLOSURE OF INVENTION

Technical Problem

However, since a method of detecting the change in current value of the motor that drives the leg rest is used in the configuration of Patent Literature 1, the operation cannot be stopped unless an event such as a collision, catching, or the like of the leg rest occurs. For this reason, with the configuration of Patent Literature 1, it is impossible to inhibit the collision between leg rests or catching of luggage, a user's leg, or the like by the leg rest from occurring.

In view of the circumstances as described above, it is an object of the present invention to provide a seat apparatus and a seat system that are capable of inhibiting the collision between leg rests of the seat apparatuses facing each other or catching of luggage or the like from occurring and allowing, in the case where a power source failure or the like occurs in the front seat or back seat, the leg rest of the own seat to operate.

Solution to Problem

A seat apparatus according to an embodiment of the present invention includes: a seat body; a control unit; and a setting means.

The seat body includes a leg rest, a first operation part for operating the leg rest, and a first drive part for tilting the leg rest in a front-rear direction on the basis of an input operation of the first operation part.

The control unit includes a controller. The controller determines whether the seat body is in a first state in which the seat body does not face a front seat or a back seat of the seat body or a second state in which the seat body faces one of the front seat and the back seat. The controller enables, where the controller has determined that the seat body is in the first state, a tilt operation command for the leg rest to tilt forward from the first operation part to the first drive part, and invalidates, where the controller has determined that the seat body is in the second state, the tilt operation command.

The setting means fixes the determination result by the controller to the first state.

In the seat apparatus, the controller is configured to invalidate, in the case where the seat body faces the front seat or the back seat, the tilt operation command for the leg rest to tilt forward from the first operation part to the first drive part. As a result, it is possible to inhibit a collision between leg rests or catching of luggage or the like from occurring.

Further, for example, even in the case where the leg rest of the front seat faces the seat apparatus while being inoperable due to a power source failure or the like, the setting means enables the operation of the leg rest without invalidating the tilt operation command of the leg rest by the controller.

The control unit may further include a first detection part.

The first detection part outputs a first detection signal where a posture relationship between the seat body and the front seat is in the first state, and outputs a second detection signal where the posture relationship between the seat body and the front seat is in the second state.

In this case, the setting means includes a power supply line that is electrically connected to the first detection part and fixes output of the first detection part to the first detected signal.

The control unit may further include a second detection part.

The second detection part outputs a first detection signal where a posture relationship between the seat body and the back seat is in the first state, and outputs a second detection signal where the posture relationship between the seat body and the back seat is in the second state.

In this case, the setting means includes a power supply line that is electrically connected to the second detection part and fixes output of the second detection part to the first detection signal.

Alternatively, the setting means may be an operation member provided in the seat body.

The seat apparatus may further include a leg stand installed on a floor surface and a reverse part for reversibly supporting the seat body with respect to the leg stand.

The reverse part includes a lock mechanism for regulating rotation of the seat body, a release mechanism that releases rotational regulation of the seat body by the lock mechanism, and a return mechanism that returns the leg rest to a housing position on a rearward side when driving the release mechanism.

A seat system according to an embodiment of the present invention includes: a first seat; a second seat; a control unit; and a setting means.

The first seat includes a first leg rest, a first operation part for operating the first leg rest, and a first drive part got tilting the first leg rest in a front-rear direction on the basis of an input operation of the first operation part.

The second seat is positioned in a front row or a rear row of the first seat and is configured to be capable of reversing an orientation from a first state facing in the same direction as the first seat to a second state facing the first seat.

The control unit includes a controller. The controller determines whether the second seat is in the first state or the second state. The controller enables, where the controller has determined that the second seat is in the first state, a tilt operation command for the leg rest to tilt forward from the first operation part to the first drive part, and invalidates, where the controller has determined that the second seat is in the second state, the tilt operation command.

The setting means fixes the determination result by the controller to the first state.

The control unit may include a first detection switch that outputs an off-signal where the first seat is in a forward posture, a second detection switch that outputs an on-signal where the first seat is in a forward posture, a first detection circuit that detects a state of the first detection switch, a second detection circuit that detects an orientation of a seat positioned in a front row of the first seat, a third detection circuit that detects an orientation of a seat positioned in a rear row of the first seat, and a fourth detection circuit that detects a state of the second detection switch.

The setting means may include a power supply line. The power supply line is connected to an input terminal of the second detection circuit, and supplies electric power corresponding to the on-signal to the second detection circuit.

The control unit may further include a monitoring circuit that monitors presence or absence of an abnormality in a power source circuit in the second seat. Where the monitoring circuit detects an abnormality in the power source circuit in the second seat, controller fixes the posture determination of the second seat to the first state.

The setting means may include an operation member provided in the first seat.

As described above, in accordance with the present invention, it is possible to inhibit the collision between leg rests of the seat apparatuses facing each other or catching of luggage or the like from occurring and allow, in the case where a power source failure or the like occurs in the front seat or back seat, the leg rest of the own seat to operate.

BRIEF DESCRIPTION OF DRAWINGS

FIG. 10 is a logical table showing the relationship between the output of the first and second detection switches, the output of the first to fourth detection circuits, and the control content of the leg rest according to the orientations of the own seat, the front seat, and the back seat.

FIG. 11 is the logical table when a power source failure occurs in the front seat or the back seat.

FIG. 12 is a logical table between seat apparatuses when the operation-regulation releasing unit is operated.

MODE(S) FOR CARRYING OUT THE INVENTION

Hereinafter, an embodiment of the present invention will be described with reference to the drawings.

Figure 1:
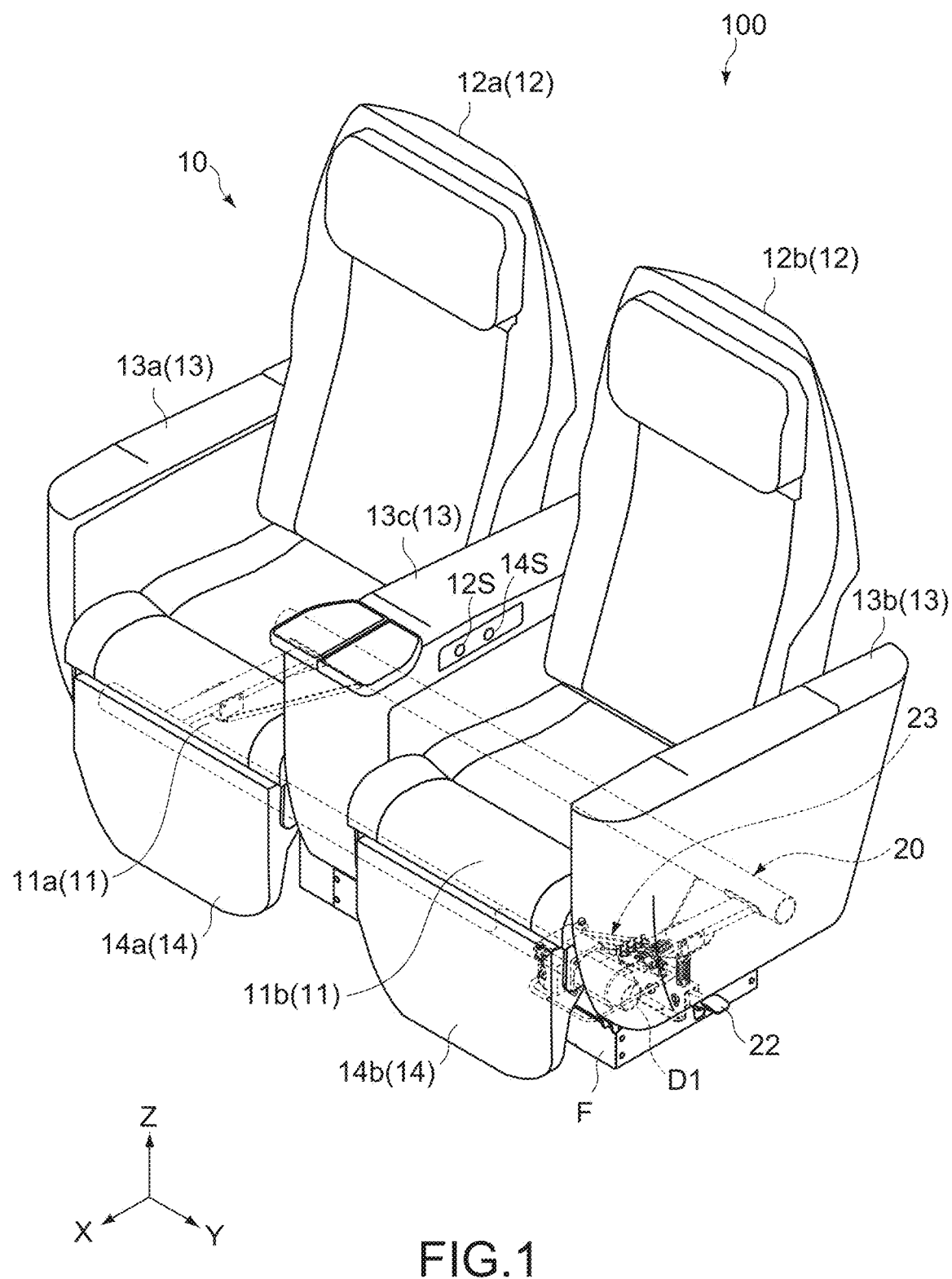
FIG. 1 is a perspective view showing the entire seat apparatus according to an embodiment of the present invention.
Figure 2:
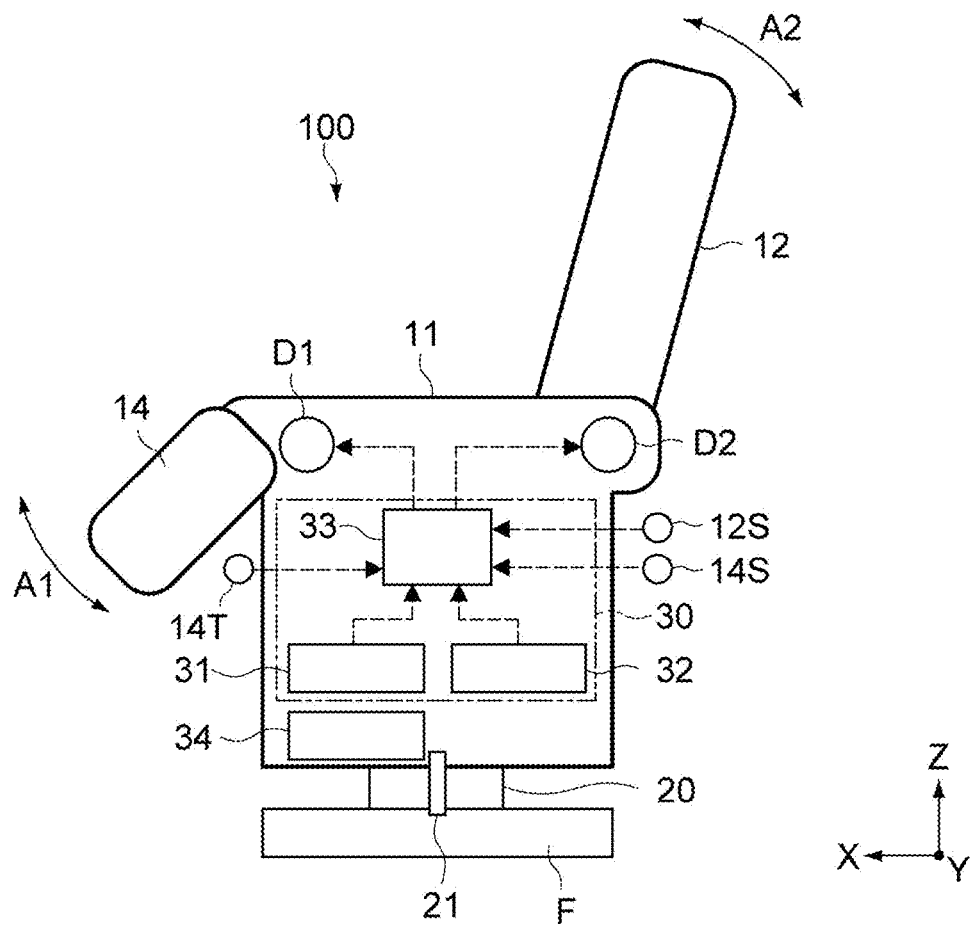
FIG. 2 is a schematic block diagram showing a configuration of the seat apparatus.

FIG. 1 is a perspective view showing an entire seat apparatus 100 according to an embodiment of the present invention. FIG. 2 is a schematic block diagram showing a configuration of the seat apparatus 100. Note that in each figure, an X-axis, a Y-axis, and a Z-axis indicate three axis directions orthogonal to each other, and the X-axis, the Y-axis, and the Z-axis respectively correspond to the front-rear direction, the right-and-left direction, and the height direction.

[Basic Configuration of Seat Apparatus]

The seat apparatus 100 includes a seat body 10, a seat base F fixed to a floor surface, a reverse part 20 that supports the seat body 10 in a reversible manner with respect to the seat base F, and a control unit 30. The seat apparatus 100 constitutes a part or all of a plurality of seats installed in a row in a passenger compartment of a railway vehicle such as a bullet train and a limited express train.

(Seat Body)

The seat body 10 includes a seat portion 11, a backrest 12, an arm rest 13, and a leg rest 14. In this embodiment, the seat body 10 includes a seat for two, but is not limited thereto. The seat body 10 may include a seat for one or a seat for three.

The backrest 12 includes two backrest portions 12a and 12b that can be tilted forward and backward, which are respectively disposed behind two seat surfaces 11a and 11b constituting the seat portion 11. The arm rest 13 includes two side arm rests 13a and 13b provided at both ends of the seat portion 11, and a center arm rest 13c provided between the seat surfaces 11a and 11b. The leg rest 14 includes two leg rest portions 14 and 14b that can be tilted forward and backward, which are respectively disposed in front of the seat surfaces 11a and 11b.

The backrest portions 12a and 12b can be tilted at an arbitrary angle by, for example, pressing an operation part 12S (second operation part) such as an operation button provided on both side surfaces of the center arm rest 13c. The seat body 10 includes a drive part (second drive part D2) that individually drives the backrest portion 12a or 12b in response to an input operation of the operation part 12S (FIG. 2).

The leg rest portions 14 and 14b can be tilted at an arbitrary angle by, for example, pressing an operation part 14S (first operation part) such as an operation button provided on both side surfaces of the center arm rest 13c. The seat body 10 includes a drive part (first drive part D1) that individually drives the leg rest portion 14 or 14b in response to an input operation of the operation part 14S (FIG. 2).

Note that the positions and configurations of the operation parts 12S and 14S are not limited to the above-mentioned example. For example, at least one of them may include an operation lever provided on the front end of the upper surface of the side arm rest 13a or 13b.

The first drive part D1 tilts, on the basis of an input operation of the operation part 14S, the leg rest 14 (leg rest portions 14 and 14b) forward and backward (in the direction indicated by an arrow A1 in FIG. 2) between the housing position and the footrest position. The housing position of the leg rest 14 is set to the rearmost position of the leg rest 14, and is typically set at an angle substantially perpendicular to the front end of the seat portion 11 (seat surfaces 11a and 11b). The footrest position of the leg rest 14 is set to an arbitrary angle position developed forward from the housing position. Hereinafter, the operation of tilting the leg rest 14 in the seat forward direction will be referred to also as the tilt operation of the leg rest 14 in the development direction.

The second drive part D2 tilts, on the basis of an input operation of the operation part 12S, the backrest 12 (backrest portions 12a and 12b) forward and backward (in the direction indicated by an arrow A2 in FIG. 2) between the initial position (return position) and the tilted position. The return position of the backrest 12 is set to the foremost position of the backrest 12, and is typically set at an angle substantially perpendicular to the rear end of the seat portion 11 (seat surfaces 11a and 11b). The backrest 12 is configured to be reclineable from this position to any angle rearward.

The first drive part D1 and the second drive part D2 each include an electric actuator such as a motor, a current detector for detecting the operation current of the electric actuator, and the like. The output of each of the cur-ent detectors is output to the control unit 30 described below. The first drive part D1 and the second drive part D2 are driven by being supplied with electric power from a power source circuit 34.

(Reverse Part)

The reverse part 20 is disposed between the seat base F and the seat body 10, and includes a rotation axis (illustration omitted) that causes the seat body 10 to rotate around an axis parallel to the Z-axis at its central position with respect to the seat base F. The reverse part 20 is configured to be capable of rotating the orientation of the seat body 10 by 180 degrees by rotating the seat body 10 around the above-mentioned rotation axis.

The reverse part 20 includes a lock pin 21, a release pedal 22, and a return mechanism 23.

The lock pin 21 is for positioning the seat body 10 with respect to the seat base F, and constitutes a lock mechanism that fixes the seat body 10 in either a forward posture in which the seat body 10 is directed forward (in the travelling direction) or a rearward posture in which the seat body 10 is directed rearward.

As shown in FIG. 1, the release pedal 22 is installed at the lower part of the seat body 10. The release pedal 22 constitutes a release mechanism that causes the lock pin 21 to sink downward by a stepping operation of a passenger or an occupant to release the rotation regulation of the seat body 10 and allows the seat body 10 to rotate to enable posture conversion between the forward posture and the rearward posture. Note that in the case where the stepping of the release pedal 22 is released, the lock pin 21 is biased upward, engaged with the seat body 10 at the forward posture position or rearward posture position of the seat body 10, and positions the seat body 10 again at the position.

The return mechanism 23 is for returning the leg rest 14 (leg rest portions 14 and 14b) to the housing position on the rearward side (see FIG. 1) when the release pedal 22 is stepped (when the release mechanism is driven). The return mechanism 23 includes, for example, a biasing member that biases the leg rest portions 14 and 14b to the housing position, a clutch that regulates the returning of the leg rest portions 14 and 14b by the biasing member, and the like. The return mechanism 23 is configured to disengage the clutch when the release pedal 22 is stepped, so that the leg rest portions 14a and 14b return to the housing position by the biasing member.

The return mechanism 23 may be further configured to return the backrest 12 (backrest portions 12a and 12b) to the return position on the forward side (see FIG. 1) when the release pedal 22 is stepped. In this case, when the release pedal 22 is stepped, the leg rest 14 and the backrest 12 are respectively returned to the housing position and the return position.

(Control Part)

Figure 3:
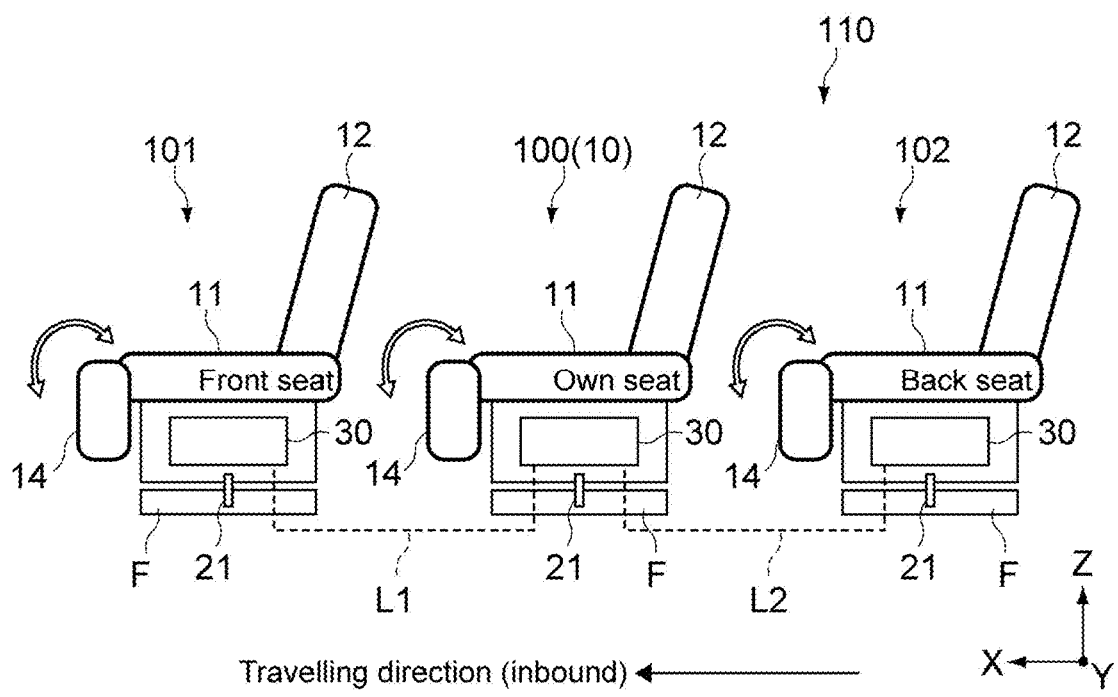
FIG. 3 is a schematic side surface view showing a seat system according to an embodiment of the present invention.

FIG. 3 is a schematic side view showing a seat system 110 including a plurality of seat apparatuses set in the forward posture. Here, for the sake of simplicity, the relationship between three seat apparatuses will be described as an example.

Hereinafter, the seat apparatus located in the front row of the seat apparatus 100 will be referred to as "the front seat 101", and the seat apparatus located in the rear row of the seat apparatus 100 will be referred to as "the back seat 102". Note that for describing the relationship between the front seat 101 and the back seat 102, the center seat apparatus 100 will be referred to also as "the own seat 100".

The front seat 101 and the back seat 102 each have the same configuration as that of the own seat 100. Here, although the control unit 30 of the own seat 100 will be described, also the control unit 30 of each of the front seat 101 and the back seat 102 is similarly configured.

The control unit 30 includes a first detection part 31, a second detection part 32, and a control part 33.

The first detection part 31 detects the orientation of the front seat 101. The control part 33 determines the posture relationship of the own seat 100 and the front seat 101 on the basis of the output of the first detection part 31, and invalidates, when the front seat 101 faces the own seat 100, a tilt operation command from the operation part 14S to the first drive part D1 in the development direction of the leg rest 14 (leg rest portions 14a and 14b). The case where the front seat 101 faces the own seat 100 indicates that the front seat 101 is reversed from the forward posture to the rearward posture via the reverse part 20 and the front seat 101 and the own seat 100 face each other.

Meanwhile, the second detection part 32 detects the orientation of the back seat 102. Then, the control part 33 determines the posture relationship of the own seat 100 and the back seat 102 on the basis of the output of the first detection part 31, and invalidates, when the back seat 102 faces the own seat 100, a tilt operation command from the operation part 14S to the first drive part D1 in the development direction of the leg rest 14 (leg rest portions 14a and 14b). The case where the back seat 102 faces the own seat 100 indicates that the own seat 100 is reversed from the forward posture to the rearward posture via the reverse part 20 and the back seat 102 and the own seat 100 face each other.

The control unit 30 of the own seat 100 and the control unit 30 of each of the front seat 101 and the back seat 102 are electrically connected to each other via wirings L1 and L2 routed under the floor, respectively. Note that the present invention is not limited thereto, and the electrical connection between the control units 30 may be performed via wireless communication.

Figure 4:
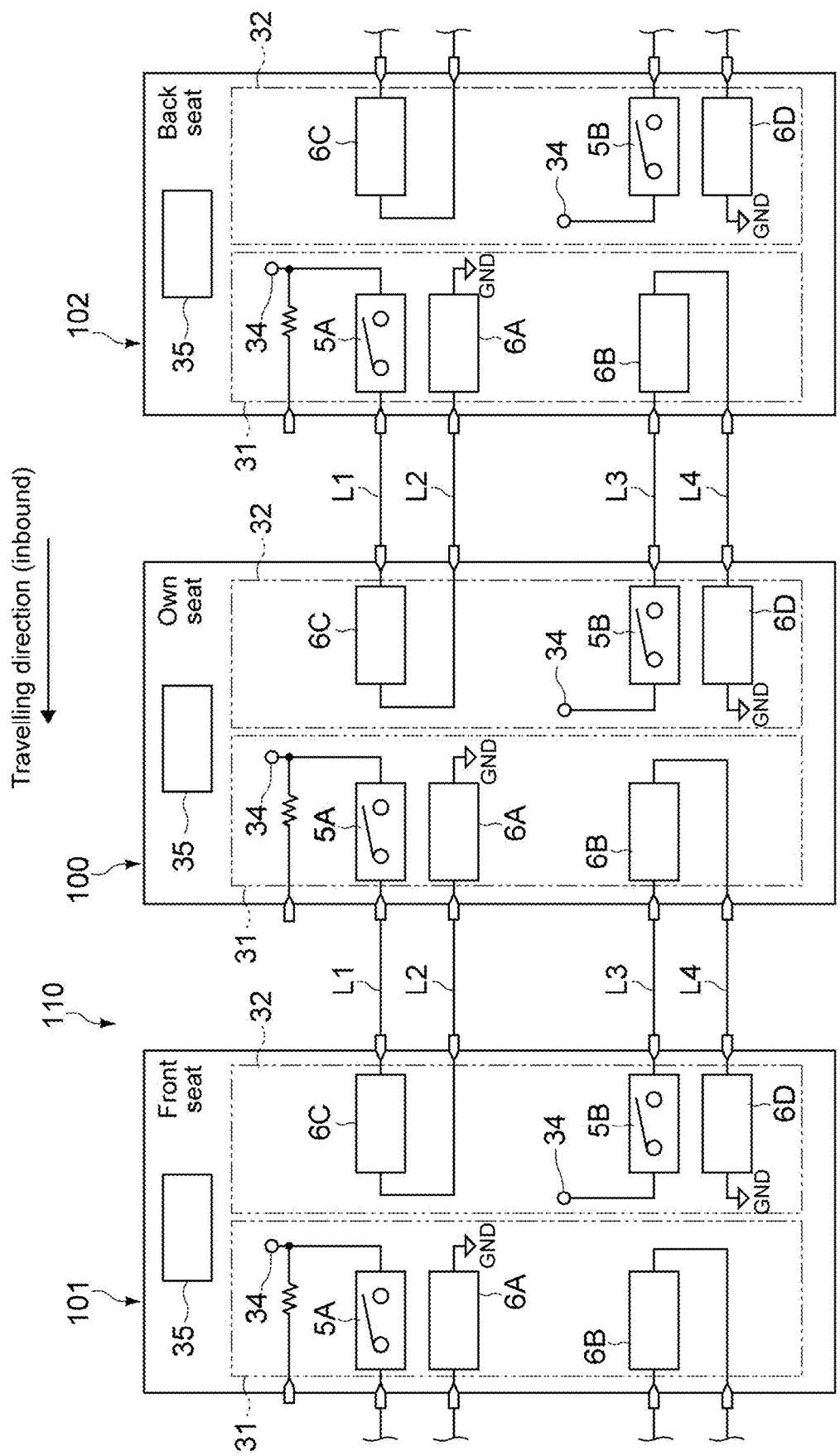
FIG. 4 is a block diagram showing a configuration example of first and second detection parts in the seat system.

FIG. 4 is a block diagram showing a configuration example of the first and second detection parts 31 and 32.

Note that in the figure, an arrow of "inbound" indicates the travelling direction of the vehicle (forward of the vehicle), and the opposite direction (rearward of the vehicle) indicates "outbound".

As shown in the figure, the first detection part 31 includes a first detection switch 5A, a first detection circuit 6A, and a second detection circuit 6B. Further, the second detection part 32 includes a second detection switch 5B, a third detection circuit 6C, and a fourth detection circuit 6D.

The first detection switch 5A includes a switch device that turns off (OFF) when the own seat 100 is in the forward posture and turns on (ON) when the own seat 100 is in the rearward posture. The input terminal of the first detection switch 5A is connected to the power source circuit 34, and the output terminal of the first detection switch 5A is connected to the input terminal of the third detection circuit 6C of the front seat 101 via the wiring L1.

Meanwhile, the second detection switch 5B includes a switch device that turns on (ON) when the own seat 100 is in the forward posture and turns off (OFF) when the own seat 100 is in the rearward posture. The input terminal of the second detection switch 5B is connected to the power source circuit 34, and the output terminal of the second detection switch 5B is connected to the input terminal of the second detection circuit 6B of the back seat 102 via a wiring L3.

The first detection circuit 6A is a circuit for detecting the state of the first detection switch 5A. The first detection circuit 6A is connected to the output terminal of the third detection circuit 6C in the front seat 101 via the wiring L2, and detects, on the basis of the output of the third detection circuit 6C in the front seat 101, whether the own seat 100 is in the forward posture or the rearward posture.

The second detection circuit 6B is a circuit for detecting the orientation of the front seat 101. The input terminal of the second detection circuit 6B is connected to the output terminal of the second detection switch 5B in the front seat 101 via the wiring L3, and the output terminal of the second detection circuit 6B is connected to the input terminal of the fourth detection circuit 6D in the front seat 101 via a wiring L4. The second detection circuit 6B detects, on the basis of the output of the second detection switch 5B in the front seat 101, whether the front seat 101 is in the forward posture or the rearward posture.

The third detection circuit 6C is a circuit for detecting the orientation of the back seat 102. The input terminal of the third detection circuit 6C is connected to the output terminal of the first detection switch 5A in the back seat 102 via the wiring L1, and the output terminal of the third detection circuit 6C is connected to the input terminal of the first detection circuit 6A in the back seat 102 via the wiring L2. The third detection circuit 6C detects, on the basis of the output of the first detection switch 5A in the back seat 102, whether the back seat 102 is in the forward posture or the rearward posture.

The fourth detection circuit 6D is a circuit for detecting the state of the second detection switch 5B. The fourth detection circuit 6D is connected to the output terminal of the second detection circuit 6B in the back seat 102 via the wiring L4, and detects, on the basis of the output of the second detection circuit 6B in the back seat 102, whether the own seat 100 is in the forward posture or the rearward posture.

The configurations of the first detection switch 5A and the second detection switch 5B are not particularly limited, and an optical switch such as a proximity switch and a photocoupler, a micro switch, or the like can be employed.

As an adoption example of the proximity switch, for example, a reed switch and a magnet are respectively disposed on the seat base F and the seat body 10, and the reed switch is configured to be sensitive to the magnet and turned ON when the seat body 10 is rotated to a predetermined position.

As an adoption example of the optical switch, for example, a light emitting device such as an infrared LED and a light receiving device such as a phototransistor are respectively disposed on the seat base F and the seat body 10, and the light receiving device is configured to receive light from the light emitting device at a predetermined rotational position and be turned on.

As an adoption example of the micro switch, for example, a switch whose contact is opened and closed by external pressure is disposed on the seat body 10, and is configured to be turned ON by being in contact with the side of the seat base F at a predetermined rotational position to close the contact.

The configurations of the first to fourth detection circuits 6A to 6D are not particularly limited, and for example, a semiconductor circuit in which the secondary-side circuit (the light receiving side) is in a conductive state when the primary-side circuit (the light emitting side) is pressurized using a semiconductor relay (a photocoupler, a photo MOS relay, or the like) can be employed.

Alternatively, a circuit (A-contact relay circuit) in which the secondary-side circuit (contact) becomes conductive when the primary-side circuit (coil) is excited, a circuit (B-contact relay circuit) in which the secondary-side circuit (contact) becomes non-conductive when the primary-side circuit (coil) is excited, or the like can be adopted.

Alternatively, the first to fourth detection circuits 6A to 6D may be configured by a computer capable of executing a program for determining the posture relationship between target two seats on the basis of the output of the detection switches 5A and 5B.

The control part 33 typically includes a computer that includes a CPU and a memory. The control part 33 determines whether the own seat 100 is in a state in which the own seat 100 does not face both the front seat 101 and the back seat 102 (hereinafter, referred to as the first state) or in a state in which the own seat 100 faces one of the front seat 101 and the back seat 102 (hereinafter, referred to as the second state). For the determination of whether the own seat 100 is in the first state or the second state, the output of the first detection part 31 and the output of the second detection part 32 are referred to.

The first detection part 31 outputs the first detection signal when the posture relationship between the own seat 100 and the front seat 101 is in the first state, and outputs the second detection signal when the posture relationship between the own seat 100 and the front seat 101 is in the second state.

In this embodiment, the first detection part 31 outputs the first detection signal when the first detection switch 5A in the own seat 100 is off and the second detection switch 5B in the front seat 101 is on, and outputs the second detection signal when both of the above-mentioned switches are off.

The second detection part 32 outputs the first detection signal when the posture relationship between the own seat 100 and the back seat 102 is in the first state, and outputs the second detection signal when the posture relationship between the own seat 100 and the back seat 102 is in the second state.

In this embodiment, the second detection part 32 outputs the first detection signal when the second detection switch 5B in the own seat 100 is on and the first detection switch 5B in the back seat 102 is off, and outputs the second detection signal when both of the above-mentioned switches are off.

The control part 33 is configured to enable, when the control part 33 has determined that the own seat 100 is in the first state, a tilt operation command of the leg rest 14 to tilt forward from the operation part 14S to the first drive part D1, and invalidate, when the control part 33 has determined that the own seat 100 is in the second state, the tilt operation command. As a result, the operation of the leg rest 14 of the own seat 100 is regulated.

FIG. 10 is a logical table showing the relationship between the output of the first and second detection switches 5A and 5B, the output of the first to fourth detection circuits 6A to 6D, and the control content of the leg rest 14 according to the orientations of the own seat 100, the front seat 101, and the back seat 102. In FIG. 10, "1" means input on, and "0" means input off.

As shown in FIG. 10, the control part 33 allows the leg rest 14 to operate without limitation when the own seat 100 is in the first state, i.e., when (1) the own seat 100 faces in the same direction as the front seat 101 and the back seat 102, (2) the own seat 100 faces in the same direction as the front seat 101 and back-to-back with the back seat 102, and (3) the own seat 100 is back-to-back with the front seat 101 and faces in the same direction as the back seat 102.

In accordance with this logical table, in the case where both of the output of the first detection circuit 6A and the output of the second detection circuit 6B are not "0" or both of the output of the third detection circuit 6C and the output of the fourth detection circuit 6D are not "0", it is determined that the state is the first state.

Meanwhile, when the own seat 100 is in the second state, i.e., when the own seat 100 faces one of the front seat 101 and the back seat 102, the control part 33 invalidates the tilt operation of the leg rest 14 to tilt forward (in the development direction), and regulates the tilt operation to only the tilt operation to tilt rearward (to the housing position).

Note that the logical table of FIG. 10 holds similarly when the front seat 101 or the back seat 102 is regarded as the "own seat".

[Basic Operation of Seat System]

Subsequently, details of the control unit 30 will be described together with the typical operation of the seat system 110 shown in FIG. 3.

Figure 5:
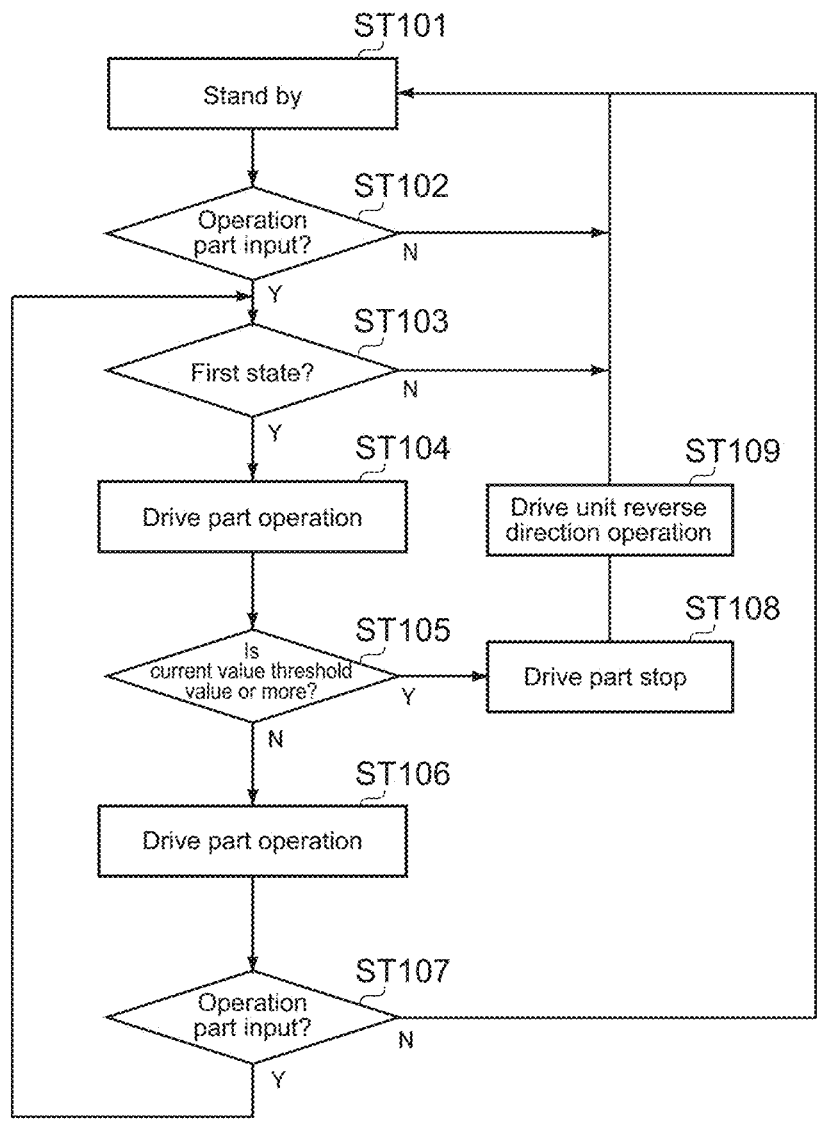
FIG. 5 is a flowchart showing an example of a processing procedure of a control unit in the seat system.
Figure 6:
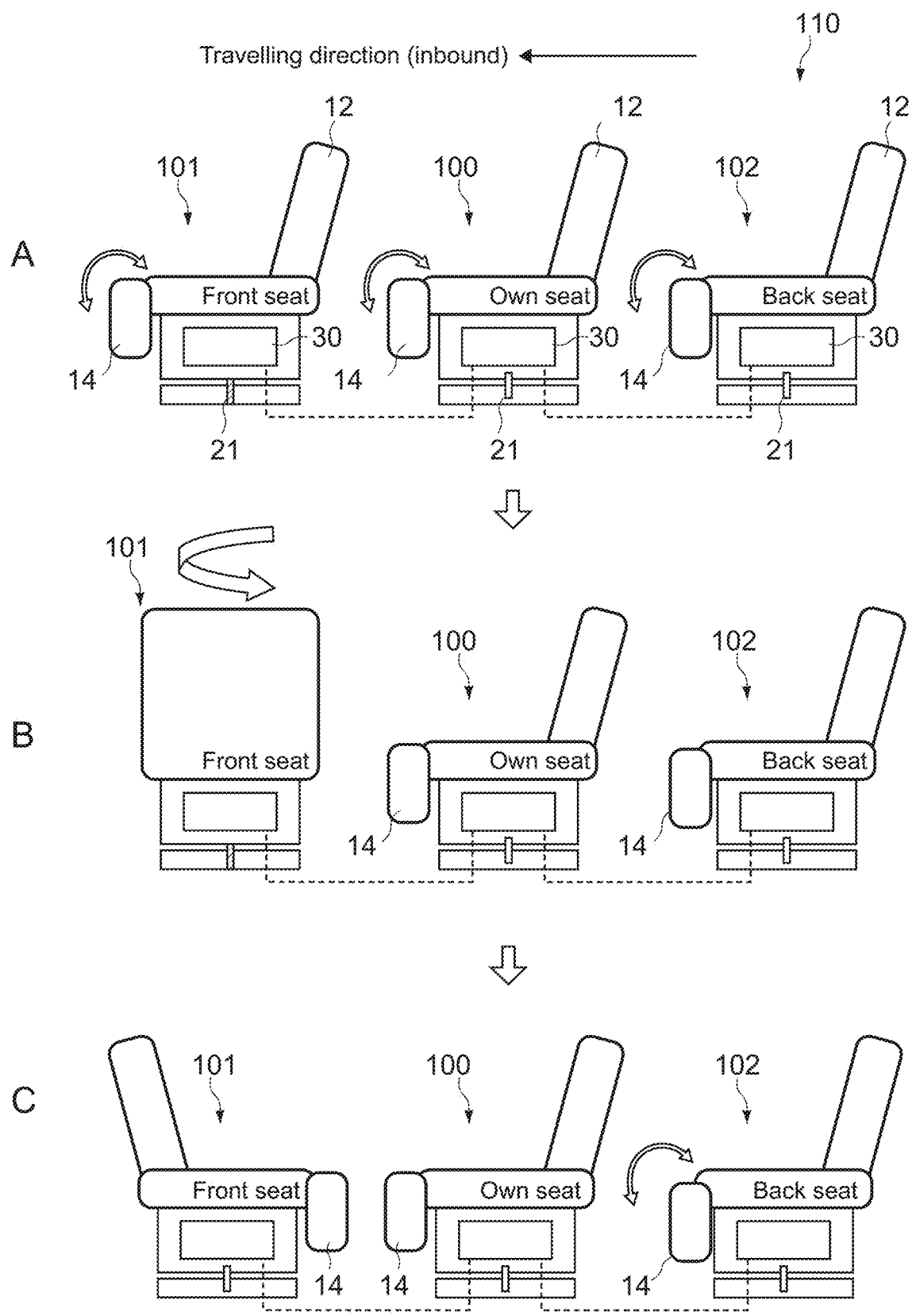
FIG. 6 is a schematic side view describing an operation of the seat system.
Figure 7:
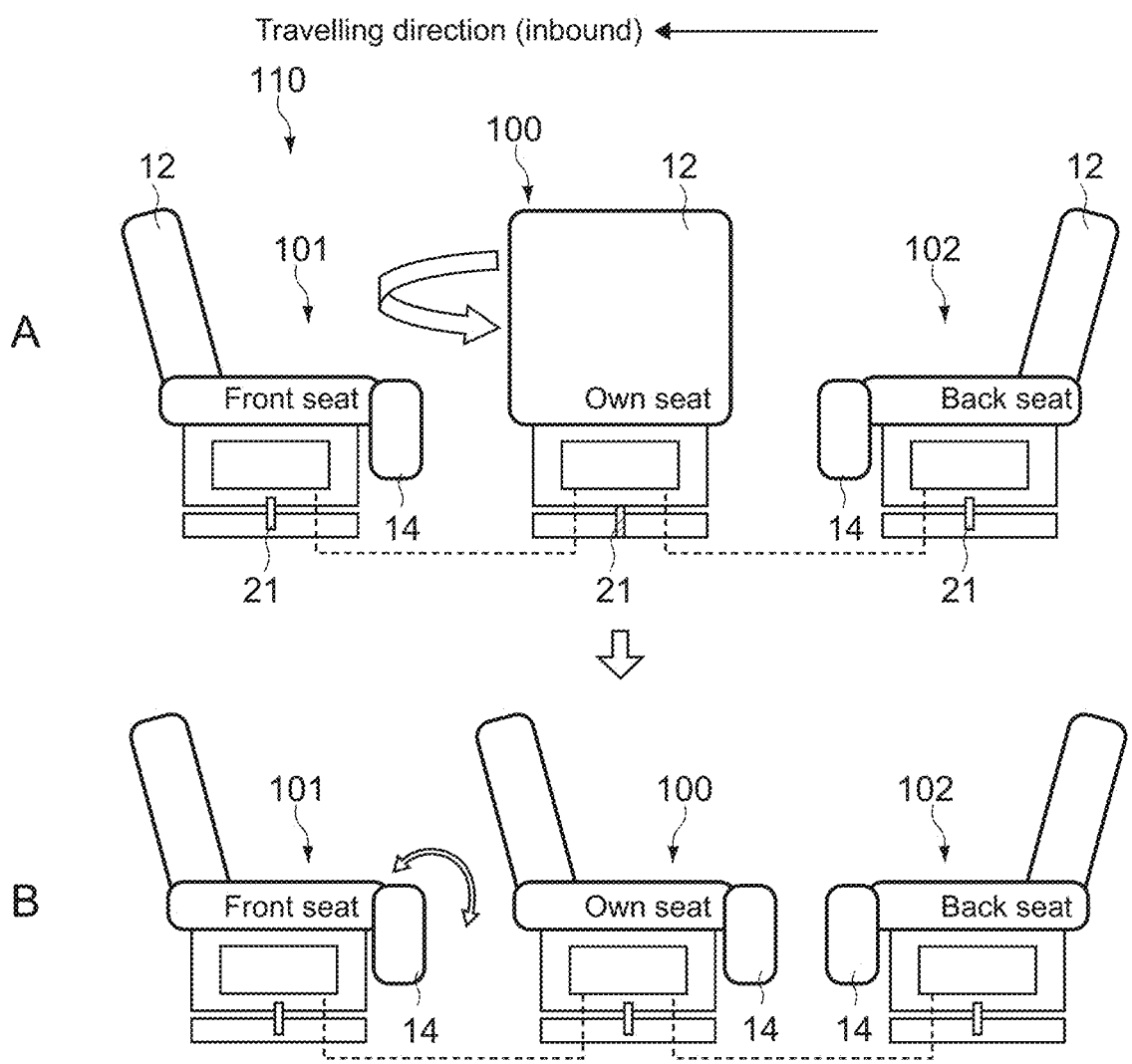
FIG. 7 is a schematic side view describing an operation of the seat system.

FIG. 5 is a flowchart showing an example of a processing procedure of the control unit 30. FIG. 6 and FIG. 7 are each a schematic side view describing an operation of the seat system 110. Hereinafter, the processing procedure of the control unit 30 (control part 33) of the own seat 100 will be mainly described.

The control part 33 stands by in the state shown in FIG. 3 and Part (A) of FIG. 6, i.e., in the state (first state) in which all of the own seat 100, the front seat 101, and the back seat 102 are set at the initial positions facing the traveling direction (forward) of the vehicle (ST101).

In this state, since any of the seats is set to the forward direction (travelling direction) of the vehicle, the operation of the leg rest 14 of each seat is not regulated and the leg rest 14 can be tilted forward and backward. The user sitting on the seat is capable of adjusting the leg rest 14 from the housing position on the rear side to the desired footrest position on the front side via the operation part 14S.

Specifically, the control part 33 determines, in the case of detecting the input operation of the operation part 14S by a user, whether or not the own seat 100 is in the first state on the basis of the output of each of the first and second detection parts 31 and 32 (ST102 and ST103). At the present time, since the own seat 100 is in the first state with respect to the front seat 101 (and the back seat 102), the own seat 100 allows driving of the first drive part D1 based on the input operation of the operation part 14S, and causes the leg rest 14 to tilt (ST104).

In this embodiment, the control part 33 monitors the operation current of the first drive part D1, and determines whether or not the current value is a predetermined threshold value or more (ST105). The above-mentioned threshold value is typically set to a current value that can occur when an object is caught between the leg rest 14 and the front seat 101. Therefore, in the case where the above-mentioned current value is less than the above-mentioned threshold value, it is determined that the operation condition of the leg rest 14 is appropriate, and the tilt operation of the leg rest 14 is continued until the input operation of the operation part 14S is stopped (ST106). Meanwhile, in the case where the above-mentioned current value is the above-mentioned threshold value or more, the operation of the leg rest 14 is stopped, and the first drive part D1 is driven in the reverse direction to cause the leg rest 14 to tilt toward the original housing position (ST108 and ST109).

Subsequently, the operation of the seat system 110 when the front seat 101 is reversed from the forward posture to the rearward posture will be described.

As shown in Part B of FIG. 6, when performing the operation of reversing the front seat 101, the lock pin 21 of the front seat 101 is released by the stepping operation of the release pedal 22 of the front seat 101. As a result, the positioning of the front seat 101 is released, and the front seat 101 can be reversed (Part B of FIG. 6). At this time, in the case where the leg rest 14 of the front seat 101 is developed forward, the leg rest 14 is pivoted to the housing position via the return mechanism 23. When the reversion of the front seat 101 from the forward posture to the rearward posture is completed, the front seat 101 is repositioned by the lock pin 21 (Part C of FIG. 6).

While the own seat 100 and the front seat 101 face each other (in the second state), since the output of the second detection switch 5B of the front seat 101 is "0" (OFF), the operation of the leg rest 14 of the own seat 100 is regulated by the control command from the first detection part 31 of the own seat 100. Similarly, regarding also the front seat 101, the operation of the leg rest 14 of the front seat 101 is regulated by the control command from the second detection part 32 of the front seat 101. Note that regarding the back seat 102, the operation of the leg rest 14 of the back seat 102 is not regulated and the leg rest 14 can be tilted to an arbitrary angle because the first state is maintained in relation to the own seat 100.

As described above, even if the control part 33 of each of the own seat 100 and the front seat 101 detects the input operation of the operation part 14S, the tilt operation command of the leg rest 14 of each of the seats in the development direction is invalidated because the posture relationship between the own seat 100 and the front seat 101 is in the second state (ST 102, ST103, and ST101). As a result, it is possible to reliably inhibit a collision between the leg rests of the own seat 100 and the front seat 101 facing each other or catching of luggage, a user's foot, or the like by the respective leg rests from occurring.

Parts A and B of FIG. 7 show the state in which the posture of the own seat 100 is changed from the forward posture to the rearward posture. The positioning of the own seat 100 is released by releasing the lock pin 21, and the own seat 100 can be reversed (Part A of FIG. 7). At this time, in the case where the leg rest 14 of the own seat 100 is developed forward, the leg rest 14 is returned to the housing position via the return mechanism 23. When the reversion of the own seat 100 from the forward posture to the rearward posture is completed, the own seat 100 is repositioned by the lock pin 21 (Part B of FIG. 7).

While the own seat 100 and the back seat 102 face each other (in the second state), since the output of the second detection switch 5B of the own seat 100 is "O" (OFF), the operation of the leg rest 14 of the back seat 102 is regulated by the control command from the first detection part 31 of the back seat 102. Similarly, regarding also the own seat 100, the operation of the leg rest 14 of the own seat 100 is regulated by the control command from the second detection part 32 of the own seat 100. Note that regarding the front seat 101, the operation of the leg rest 14 of the front seat 101 is not regulated and the leg rest 14 can be tilted to an arbitrary angle because the first state is maintained in relation to the own seat 100.

As described above, even if the control part 33 of each of the own seat 100 and the back seat 102 detects the input operation of the operation part 14S, the tilt operation command of the leg rest 14 of each of the seats in the development direction is invalidated because the posture relationship between the own seat 100 and the back seat 102 is in the second state (ST102, ST103, and ST101). As a result, it is possible to reliably inhibit a collision between the leg rests of the own seat 100 and the back seat 102 facing each other or catching of luggage, a user's foot, or the like by the respective leg rests from occurring.

[Setting Means]

In the seat apparatus 100 according to this embodiment, the operation of the leg rest 14 is regulated in accordance with the posture relationships with the front seat 101 and the back seat 102 as described above. The determination of the posture relationship is performed in the control part 33 on the basis of the output of each of the first detection part 31 and the second detection part 32. The detection parts 31 and 32 each use, as a drive source, the power source circuit 34 installed for each seat apparatus.

Here, in the case where at least one of the own seat 100, the front seat 101, or the back seat 102 has an abnormality such as a failure in the power source circuit 34, the detection switches 5A and 5B, or the detection circuits 6A to 6D, it becomes impossible to determine the posture relationship between the own seat and the seat apparatuses in front and rear rows.

Therefore, for example, in the case where an abnormality occurs in the front seat 101, the second detection circuit 6B in the own seat 100 is determined to be in the second state even though the own seat 100 is in the first state with respect to the front seat 101 because the output from the second detection switch 5B in the front seat 101 is not obtained (the output is off). As a result, the operation of the leg rest 14 of the own seat 100 is regulated.

Similarly, also in the case where an abnormality occurs in the back seat 102, the third detection circuit 6C in the own seat 100 is determined to be in the second state even though the own seat 100 is in the first state with respect to the back seat 102 because the output from the first detection switch 5A in the back seat 102 cannot be obtained (the output is off), and the operation of the leg rest 14 is regulated.

FIG. 11 is the logical table when a power source failure occurs in the front seat 101 or the back seat 102. In the case where a power source failure occurs in the front seat 101, the signals to be input to the second detection circuit 6B in the own seat 100 are turned off. Therefore, even in the case where both the own seat 100 and the front seat 101 are directed forward on the basis of the determination result in the control part 33, the operation of the leg rest 14 of the own seat 100 is regulated.

Similarly, in the case where a power source failure occurs in the back seat 102, the signals to be input to the third detection circuit 6C in the own seat 100 are "0" (OFF). Therefore, even in the case where both the own seat 100 and the back seat 102 are directed backward on the basis of the determination result in the control part 33, the operation of the leg rest 14 of the own seat 100 is regulated.

Note that in the case where an abnormality occurs in the detection circuits 6A to 6D in the front seat 101 or the back seat 102, the output of the first detection circuit 6A or the fourth detection circuit 6D in the own seat 100 is "0" (OFF). As a result, in all of the cases listed in FIG. 11, the leg rest 14 of the own seat 100 is subjected to the operation regulation control.

In order to solve such a problem, the seat apparatus 100 according to this embodiment includes a setting means for allowing the leg rest 14 in the own seat to operate without limitation even in the case where an abnormality such as a power source failure occurs in the front seat 101 or the back seat 102.

Hereinafter, a configuration example of a setting means will be described.

Configuration Example 1

In this configuration example, the setting means includes an operation-regulation releasing unit 14T (see FIG. 2) provided in the seat body 10. The control part 33 fixes the determination result of the posture relationship with respect to the front seat 101 acquired in the first detection part 31 to the first state by operating the operation-regulation releasing unit 14T. More specifically, the operation-regulation releasing unit 14T fixes the output of the second detection circuit 6B in the own seat 100 to "1". This allows the leg rest 14 of the own seat 100 to operate without limitation, regardless of the posture relationship between the own seat 100 and the front seat 101.

Further, when the operation-regulation releasing unit 14T is operated, the control part 33 fixes the determination result of the posture relationship with respect to the back seat 102 acquired in the second detection part 32 to the first state. More specifically, the operation-regulation releasing unit 14T fixes the output of the third detection circuit 6C in the own seat 100 to "1". This allows the leg rest 14 of the own seat 100 to operate without limitation, regardless of the posture relationship between the own seat 100 and the back seat 102.

FIG. 12 shows a logical table between seat apparatuses when the operation-regulation releasing unit 14T is operated.

The operation-regulation releasing unit 14T typically includes a mechanical switch such as a press switch and a slide switch. The operation-regulation releasing unit 14T may include an operation member that is different from an operation member for other purposes such as the operation parts 12S and 14S of the backrest 12 and the leg rest 14, or may include the same operation member as at least one of these. The operation-regulation releasing unit 14T may be configured such that the operation of releasing the operation regulation is enabled by pressing the operation member in a predetermined procedure (long press, short press, intermittent press). In addition, the operation-regulation releasing unit 14T is not limited to the above, and may be various electronic components such as connectors configured attachably/detachably to the control part 33.

The operation-regulation releasing unit 14T is operated after checking the abnormality in the front seat 101 or the back seat 102. The operator is typically limited to vehicle personnel such as vehicle occupants, train station personnel, and railway engineers.

Configuration Example 2

Figure 8:
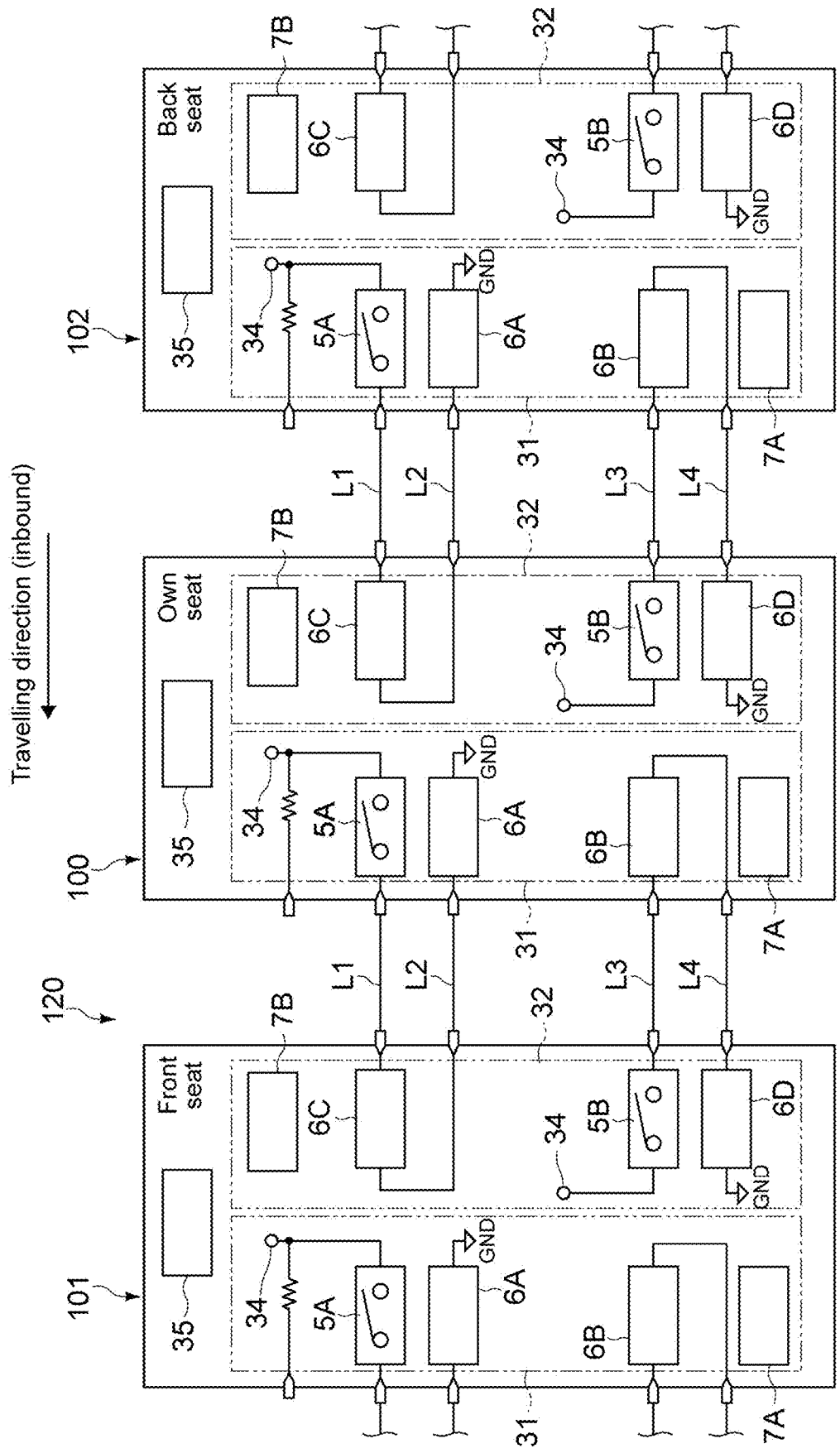
FIG. 8 is a block diagram showing another configuration example of the seat system.

FIG. 8 is a block diagram showing the configuration of a seat system 120 according to this configuration example. In the figure, portions corresponding to those in FIG. 4 are denoted by the same reference symbols, and description thereof is omitted or simplified.

The seat system 120 according to this configuration example includes a first monitoring circuit 7A and a second monitoring circuit 7B as a setting means of releasing the operation regulation of the leg rest 14.

The first monitoring circuit 7A includes an ammeter or a voltmeter capable of detecting the energization of the second detection circuit 6B, and monitors the presence or absence of an abnormality of the power source circuit 34 in the front seat 101 via the second detection circuit 6B. The first monitoring circuit 7A is configured as a part of the control unit 30, and outputs, in the case where an abnormality is detected in the power source circuit 34 of the front seat 101, an abnormality detection signal to the control part 33 to fix the output of the second detection circuit 6B to "1" (ON) (see the output of "detection circuit (6B)" in the items "2-1" to "2-4" in FIG. 12).

Meanwhile, the second monitoring circuit 7B includes an ammeter or a voltmeter capable of detecting the energization of the third detection circuit 6C, and monitors the presence or absence of an abnormality in the power source circuit 34 in the back seat 102 via the third detection circuit 6C. The second monitoring circuit 7B is configured as a part of the control unit 30, and outputs, in the case where an abnormality is detected in the power source circuit 34 of the back seat 102, an abnormality detection signal to the control part 33 to fix the output of the third detection circuit 6C to "1" (ON) (see the output of "detection circuit (6C)" in the items "2-5" to "2-8" in FIG. 12).

In this configuration example, in the case where an abnormality is detected in the power source of the front seat 101 or the back seat 102, the operation regulation of the leg rest is released. In accordance with this configuration example, in the case where a power source failure is detected, the output of the second detection circuit 6B or the third detection circuit 6C is automatically fixed to "1", and thus, the operation regulation of the leg rest can be released without requiring a predetermined operation of the operation member.

Note that although the monitoring circuits 7A and 7B are respectively configured to detect abnormalities in the power source circuits 34 of the front seat 101 and the back seat 102 via the second detection circuit 6B and the third detection circuit 6C, the present invention is not limited thereto. For example, the monitoring circuits 7A and 7B may be configured to directly monitor the power source circuits 34 of the front seat 101 and the back seat 102.

Configuration Example 3

Figure 9:
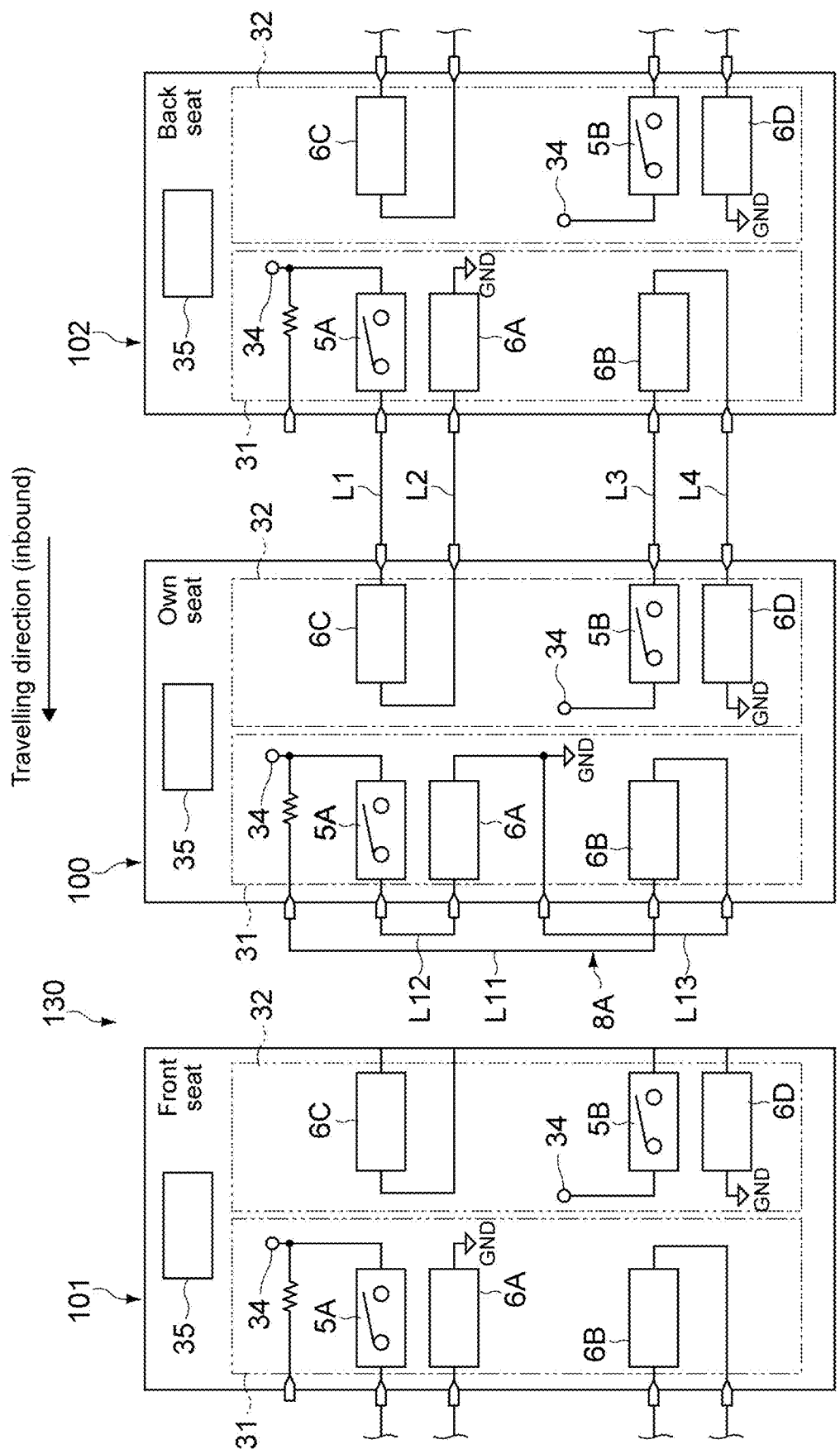
FIG. 9 is a block diagram showing another configuration example of the seat system.

FIG. 9 is a block diagram showing the configuration of a seat system 130 according to this configuration example. In the figure, portions corresponding to those in FIG. 4 are denoted by the same reference symbols, and description thereof is omitted or simplified.

The seat system 130 according to this configuration example includes a power supply line 8A as a setting means for releasing the operation regulation of the leg rest 14.

The power supply line 8A includes first to third wiring members L11 to L13 connected to the first detection part 31.

The first wiring member L11 connects between the power source circuit 34 and the input terminal of the second detection circuit 6B. The second wiring member L12 connects between the output terminal of the first detection switch 5A and the input terminal of the first detection circuit 6A. The third wiring member L13 connects between the output terminal of the second detection circuit 6B and the ground terminal.

With the first to third wiring members L11 to L13, the first detection circuit 6A and the second detection circuit 6B can be operated by the power source circuit 34 of the own seat 100. In this case, the first detection circuit 6A detects the output of the first detection switch 5A (the posture of the own seat 100). The electric power corresponding to the on-signal is supplied to the second detection circuit 6B, whereby the output of the second detection circuit 6B is fixed to "1" (ON). As a result, even in the case where a power source failure or the like occurs in the front seat 101, the operation regulation of the leg rest 14 of the own seat 100 can be released.

Further, in accordance with this embodiment, the seat apparatus to which the power supply line 8A is connected can be applied to the seat apparatus located in the front (first) row. Since there are no seats located in the front row of the seat apparatus located in the first row, the posture detection with respect to the front seat becomes unnecessary. In accordance with this embodiment, since the seat apparatus of the specifications for the first row can be configured only by connecting the power supply line 8A to the first detection part 31, it is possible to standardize the configuration with the seat apparatuses of the respective rows.

The power supply line having the above-mentioned configuration can be similarly applied also to the second detection part 32. In this case, the power supply line includes a wiring member that connects between the input terminal of the third detection circuit 6C and the power source circuit 34, a wiring member that connects between the output terminal of the third detection circuit 6C and the ground terminal, and a wiring member that connects between the output terminal of the second detection switch 5B and the input terminal of the fourth detection circuit 6D, although not shown. As a result, even in the case where a power source failure or the like occurs in the back seat 102, the operation regulation of the leg rest 14 of the own seat 100 can be released. Further, it is possible to apply the seat apparatus to the seat apparatus located in the last row.

While embodiments of the present invention have been described above, it is needless to say that the present invention is not limited to the above-mentioned embodiments only, and various modifications can be made.

For example, although the seat system including three seats (the own seat 100, the front seat 101, and the back seat 102) has been described as an example in the above-mentioned embodiment, it goes without saying that the number of seats is not limited thereto, and the present invention may be applied to all seats in each row in a vehicle.

Further, in the above-mentioned embodiment, the first detection switch 5A is switched to the OFF state and the second detection switch 5B is switched to the ON state when the own seat 100 is in the forward posture, but the present invention is not limited thereto. The first detection switch may be switched to the ON state and the second detection switch may be switched to the OFF state. In accordance therewith, the logical table on which the posture determination is based may also be changed.

Further, only the operation regulation of the leg rest 14 has been described as an example in the above-mentioned embodiment, it is possible to realize the operation regulation of not only the leg rest 14 but also the backrest 12.

REFERENCE SIGNS LIST

5A first detection switch
5B second detection switch
6A first detection circuit
6B second detection circuit
6C third detection circuit
6D fourth detection circuit
7A first monitoring circuit
7B second monitoring circuit
8A power supply line
10 seat body
12 backrest
14 leg rest
15 reverse part
21 lock pin
30 control unit
31 first detection part
32 second detection part
100 seat apparatus (own seat)
101 front seat
102 back seat
110,120,130 seat system
14T operation-regulation releasing unit
F leg stand

The invention claimed is:

1. A seat apparatus, comprising:
a seat body that includes a leg rest, a first operation part for operating the leg rest, and a first drive part for tilting the leg rest in a front-rear direction on a basis of an input operation of the first operation part;
a control unit including a controller that determines whether the seat body is in a first state in which the seat body does not face a front seat or a back seat of the seat body or a second state in which the seat body faces one of the front seat and the back seat, enables, where the controller has determined that the seat body is in the first state, a tilt operation command for the leg rest to tilt forward from the first operation part to the first drive part, and invalidates, where the controller has determined that the seat body is in the second state, the tilt operation command; and
a setting means that fixes the determination result by the controller to the first state,
wherein the controller determines whether it is the first state or the second state based on a logical table for recognizing the first state as the first state and the second state as the second state, and
wherein the setting means includes an operation-regulation releasing unit that causes the controller to determine the second state as the first state by changing the second state in the logical table to the first state.

2. The seat apparatus according to claim 1, wherein the setting means is an operation member provided in the seat body.

3. The seat apparatus according to claim 1, further comprising
a leg stand installed on a floor surface and a reverse part for reversibly supporting the seat body with respect to the leg stand,
wherein the reverse part includes a lock mechanism for regulating rotation of the seat body, a release mechanism that releases rotational regulation of the seat body by the lock mechanism, and a return mechanism that returns the leg rest to a housing position on a rearward side when driving the release mechanism.

4. A seat system, comprising:
a first seat that includes a first leg rest, a first operation part for operating the first leg rest, and a first drive part for tilting the first leg rest in a front-rear direction on a basis of an input operation of the first operation part;
a second seat that is positioned in a front row or a rear row of the first seat and is configured to be capable of reversing an orientation from a first state facing in the same direction as the first seat to a second state facing the first seat;
a control unit including a controller that determines whether the second seat is in the first state or the second state, enables, where the controller has determined that the second seat is in the first state, a tilt operation command for the leg rest to tilt forward from the first operation part to the first drive part, and invalidates, where the controller has determined that the second seat is in the second state, the tilt operation command; and
a setting means that fixes the determination result by the controller to the first state,
wherein the controller determines whether it is the first state or the second state based on a logical table for recognizing the first state as the first state and the second state as the second state, and
wherein the setting means includes an operation-regulation releasing unit that causes the controller to determine the second state as the first state by changing the second state in the logical table to the first state.

5. A seat system, comprising:
a first seat that includes a first leg rest, a first operation part for operating the first leg rest, and a first drive part for tilting the first leg rest in a front-rear direction on a basis of an input operation of the first operation part;
a second seat that is positioned in a front row or a rear row of the first seat and is configured to be capable of reversing an orientation from a first state facing in the same direction as the first seat to a second state facing the first seat;

a control unit including a controller that determines whether the second seat is in the first state or the second state, enables, where the controller has determined that the second seat is in the first state, a tilt operation command for the leg rest to tilt forward from the first operation part to the first drive part, and invalidates, where the controller has determined that the second seat is in the second state, the tilt operation command; and a setting means that fixes the determination result by the controller to the first state, wherein the control unit includes
- a first detection switch that outputs an off-signal where the first seat is in a forward posture,
- a second detection switch that outputs an on-signal where the first seat is in a forward posture,
- a first detection circuit that detects a state of the first detection switch,
- a second detection circuit that detects an orientation of a seat positioned in a front row of the first seat,
- a third detection circuit that detects an orientation of a seat positioned in a rear row of the first seat, and
- a fourth detection circuit that detects a state of the second detection switch, and wherein the setting means includes a power supply line that is connected to an input terminal of the second detection circuit, and supplies electric power corresponding to the on-signal to the second detection circuit.

6. The seat system according to claim 5, wherein the setting means includes an operation member provided in the first seat.

7. A seat system, comprising:
a first seat that includes a first leg rest, a first operation part for operating the first leg rest, and a first drive part for tilting the first leg rest in a front-rear direction on a basis of an input operation of the first operation part;
a second seat that is positioned in a front row or a rear row of the first seat and is configured to be capable of reversing an orientation from a first state facing in the same direction as the first seat to a second state facing the first seat;
a control unit including a controller that determines whether the second seat is in the first state or the second state, enables, where the controller has determined that the second seat is in the first state, a tilt operation command for the leg rest to tilt forward from the first operation part to the first drive part, and invalidates, where the controller has determined that the second seat is in the second state, the tilt operation command; and
a setting means that fixes the determination result by the controller to the first state, wherein the control unit includes
- a first detection switch that outputs an off-signal where the first seat is in a forward posture,
- a second detection switch that outputs an on-signal where the first seat is in a forward posture,
- a first detection circuit that detects a state of the first detection switch,
- a second detection circuit that detects an orientation of a seat positioned in a front row of the first seat,
- a third detection circuit that detects an orientation of a seat positioned in a rear row of the first seat, and
- a fourth detection circuit that detects a state of the second detection switch, wherein the setting means includes a power supply line that is connected to an input terminal of the second detection circuit, and supplies electric power corresponding to the on-signal to the second detection circuit, wherein the control unit further includes a monitoring circuit that monitors presence or absence of an abnormality in a power source circuit in the second seat, and wherein the controller fixes, where the monitoring circuit detects an abnormality in the power source circuit in the second seat, the posture determination of the second seat to the first state.

8. A seat apparatus, comprising:
a seat body that includes a leg rest, a first operation part for operating the leg rest, and a first drive part for tilting the leg rest in a front-rear direction on a basis of an input operation of the first operation part;
a control unit including a controller that determines whether the seat body is in a first state in which the seat body does not face a front seat or a back seat of the seat body or a second state in which the seat body faces one of the front seat and the back seat, enables, where the controller has determined that the seat body is in the first state, a tilt operation command for the leg rest to tilt forward from the first operation part to the first drive part, and invalidates, where the controller has determined that the seat body is in the second state, the tilt operation command; and
a setting means that fixes the determination result by the controller to the first state, wherein the control unit further includes a monitoring circuit that monitors presence or absence of an abnormality in a power source circuit in the second seat, and wherein the controller fixes, where the monitoring circuit detects an abnormality in the power source circuit in the second seat, the posture determination of the second seat to the first state.

* * * * *